United States Patent [19]
Crawshay

[11] 3,992,019
[45] Nov. 16, 1976

[54] DRILL HEAD WITH LOCKING CHUCK
[75] Inventor: Richard Crawshay, North Vancouver, Canada
[73] Assignee: Canadian Mine Serives Ltd., Vancouver, Canada
[22] Filed: Feb. 18, 1975
[21] Appl. No.: 550,347

[30] Foreign Application Priority Data
May 24, 1974 United Kingdom............... 23479/74

[52] U.S. Cl.................................. 279/4; 279/57; 279/74; 279/121
[51] Int. Cl.² ................... B23B 31/30; B23B 31/16
[58] Field of Search ............... 279/1 ME, 4, 55, 57, 279/65, 66, 71, 74, 121, 122

[56] References Cited
UNITED STATES PATENTS

| | | | |
|---|---|---|---|
| 3,292,939 | 10/1966 | Lorenz............................ | 279/74 X |
| 3,434,337 | 3/1969 | Goeke............................ | 279/121 X |
| 3,451,314 | 6/1969 | Smrekar......................... | 279/4 X |
| 3,533,636 | 10/1970 | Firestone et al. ................ | 279/4 |
| 3,692,320 | 9/1972 | Lindelof et al. ................. | 279/4 |
| 3,792,869 | 2/1974 | Braun ............................ | 279/4 |

FOREIGN PATENTS OR APPLICATIONS

| | | | |
|---|---|---|---|
| 1,282,418 | 11/1968 | Germany......................... | 279/57 |

Primary Examiner—Othell M. Simpson
Assistant Examiner—W. R. Briggs
Attorney, Agent, or Firm—Carver and Company

[57] ABSTRACT

Core sampling drill head having powered drill chuck with jaws to grip drill rod. Head has thrust member movable by chuck actuating means between jaws retracted and jaws extended position, and precompressed chuck springs cooperating with thrust member and drill chuck so as to be movable with thrust member. Thrust member is located by releasable locking means in desired position, which means also relieve drill bearings of reaction from chuck springs. When thrust member is in jaws retracted position, chuck springs are precompressed by tension means and relatively large diameter tools can pass drill chuck. When thrust member is in jaws extended position, chuck springs cooperate with chuck, are further compressed and extend jaws to grip rod, and tension means are relieved of load from chuck springs. By precompressing and moving springs by themselves, worn drill rods can be accommodated in relatively short drill head without loss of grip. Also, with hydraulically controlled chuck actuating means, when chuck jaws are gripping rod loss of hydraulic fluid pressure does not result in loss of grip on rod as chuck springs are independent of fluid pressure.

19 Claims, 13 Drawing Figures

DRILL HEAD WITH LOCKING CHUCK

BACKGROUND OF THE INVENTION

1. Field of the Invention

The invention relates to a drill head as used in geological exploration, particularly adapted for, but not limited to, use as a core sampling drill head such as used in diamond drilling.

2. Prior Art

Two main types of drill heads are known to the present inventor and in both types the drill head has a powered drill chuck having chuck jaws movable inwards to grip a drill rod to rotate the rod about a drill rod axis and to resist axial forces on the rod. In the first type the jaws are extended or closed by a hydraulically applied force, and in the second type the jaws are extended by force from mechanical springs. The first type is satisfactory for many applications, but when drilling upwards a hydraulic pressure failure would probably result in the jaws losing grip on the drill rod. If grip of the drill rod is lost the string of drill rods in the hole is likely to fall from the hole resulting in possible injury to operators and damage to the drilling apparatus. In the second type of drill head, closure of the jaws is essentially failsafe with regard to hydraulic pressure failure, but size of the springs necessary to provide sufficient grip for a practical range of diameters of drill rods results in a drill head of impractical length for use underground.

There is an inherent problem in using compression springs to actuate jaws of a drill chuck. It is well known that force from the compression springs decreases with increase in the extension of the springs. Thus, when a worn rod, that is a rod of reduced diameter, is gripped by the jaws, or when the chuck itself is worn, commonly there is insufficient gripping force available due to excessive extension of the chuck springs, and thus slippage between the jaws and rod is likely. Range of accommodation of the springs can be increased by increasing the length of the springs, but this increases the axial length of the drill head, thus restricting use of the drill in confined spaces. Furthermore, other tools, e.g. drill reaming shells, are sometimes required for passing through the drill head, which tools commonly have a larger diameter than the drill rods. Such tools would interfere with the chuck jaws if the chuck jaws cannot retract further than required for drill rods so as to leave sufficient space to pass the tools. Retraction of the jaws to pass larger diameter tools requires overcoming excessive chuck spring force, which force increases with retraction of the springs, or with increase in length of springs. Also, with many conventional drill heads, replacement or servicing of the chuck and associated components requires extensive dismantling of the machine. Also, in some drill chucks, reaction from forces maintaining the jaws gripping the rod is carried by bearing journalling the chuck, which bearings thus have to be correspondingly larger than otherwise required for resisting drilling forces alone.

SUMMARY OF THE INVENTION

The present invention reduces difficulties and disadvantages of the prior art by providing a drill head in which the chuck jaws are brought into engagement with the drill rod by force from a fluid actuated cylinder compressing mechanical chuck springs, but in which, once the jaws are locked on the rod loss of fluid pressure does not result in loss of grip on the rod. Furthermore, the head is physically compact, provides a reasonably wide range of accommodation of rod diameters whilst maintaining adequate gripping force for reduced diameter rods, and also provides sufficient clearance in the head for passing larger items through the head. The drill head uses relatively short length springs to extend the chuck jaws, the springs being pre-loaded to apply a minimum force adequate for gripping rods of reduced diameter. Members cooperating with the springs are movable to permit movement of the springs whilst still compressed to attain full retraction of the chuck jaws to pass large diameter tools through the head. A further advantage relates to the fact that, when the chuck jaws are locked on the rod, force from activating the jaws is not reacted on bearings journalling the chuck components. Also the head is so constructed to permit easy replacement of components associated with activating the jaws.

A drill head according to the invention includes an elongated powered spindle to accept a drill rod, and a drill chuck having chuck jaws movable inwards to grip a drill rod for rotation about a drill rod axis. The drill head is characterized by first detent location means associated with the spindle and, a first thrust member movable between jaws retracted and jaws extended positions. The head includes detent means movable between jaws retracted and jaws extended positions, which means are generally complementary to the detent location means and cooperate with the spindle and the first thrust member to hold the first thrust member in the jaws extended positions. A, precompressed chuck spring means cooperates with the first thrust member and the drill chuck so as to be movable in its entirety with the first thrust member. A chuck actuating means, which is stationary when the drill head rotates, cooperates with the first thrust member to move the first thrust member relative to the spindle from the jaws retracted to the jaws extended position. Thus the chuck actuating means further compresses the spring means to apply closing force to the chuck jaws, and is disengaged from the first thrust member during operation of the drill to prevent interference therebetween. In the jaws retracted position of the first thrust member, the spring means are precompressed and positioned to permit the jaws to retract to permit relatively large diameter tools to pass the jaws. In the jaws extended position of the first thrust member the spring means are further compressed and cooperate with the chuck jaws to extend the jaws inward to grip the drill rod.

A detailed disclosure following, related to drawings, describes a preferred embodiment of the invention which however is capable of expression in structure other than that particularly described and illustrated.

DESCRIPTION OF THE DRAWINGS

FIG. 9 is a simplified section on Line 9—9 of FIG. 8.

DETAILED DISCLOSURE

Figure 1:
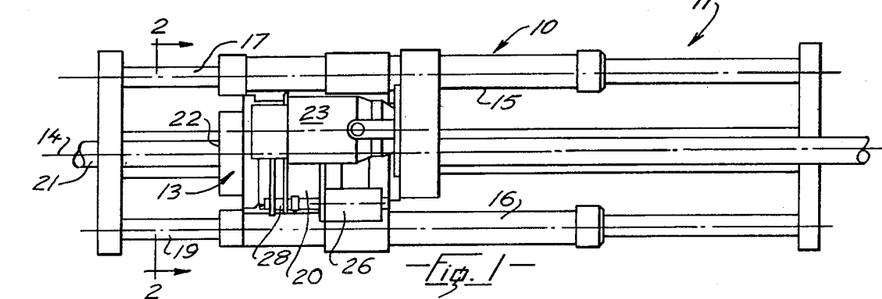
FIG. 1 is a simplified top plan view of one type of drill supporting and feeding apparatus associated with a drill head according to the invention.
Figure 2:
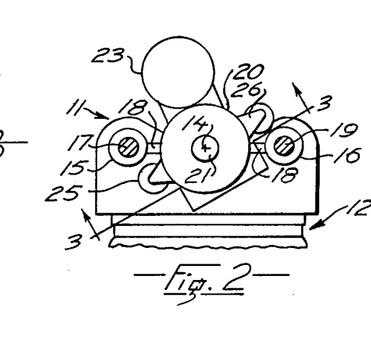
FIG. 2 is a simplified fragmented transverse section on Line 2—2 of FIG. 1.
Figure 3:
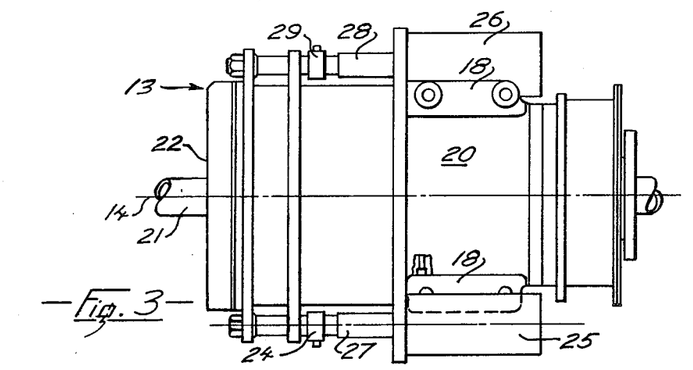
FIG. 3 is a simplified section, generally on Line 3—3 of FIG. 2, showing a drill head of the invention remote from other portions of the apparatus.

FIGS. 1 through 3

A drill head supporting apparatus 10 includes a feed frame 11 carried on a drill bed 12. A drill head 13 according to the invention has a longitudinal axis 14 disposed parallel to a pair of double-acting, doublerod hydraulic feed cylinders 15 and 16 of the feed frame. The head 13 is secured to bodies of the feed cylinders by diametrically opposed mounting means or lugs 18 extending from an outer body 20 of the head. The body and lugs serve as drill head mounting means for supporting the drill head and associated components as will be described. Double piston rods 17 and 19 of the cylinders 15 and 16 extend between opposite ends of the frame 11 as shown so that actuation of the feed cylinders moves the drill head axially along the longitudinal axis 14 relative to the bed 12. Thus the feed cylinders and frame serve as drill head feed means for feeding or withdrawing a drill rod 21 gripped in a chuck 22 of the drill head. Means other than the feed frame 11 can be used to support and feed the drill head. The drill rod 21 has a central axis coincident with the axis 14 and is typically between 1¾ and 2 3/16 inches in outside diameter, as used in diamond drilling. By mechanism to be described the drill chuck is rotated by a hydraulic motor 23 carried on the mounting means, and jaws of the chuck are actuated by a pair of chuck actuating cylinders 25 and 26 spaced on opposite sides of the body and secured by brackets extending from the body. The actuating cylinders 25 and 26 are double-acting and have single piston rods 27 and 28 respectively. Two similar disengaging cylinders 24 and 29 cooperate with the rods 27 and 28 respectively and portions of the drill head. The motor 23 and six cylinders 15, 16, 24, 25, 26 and 29 are fed selectively with hydraulic fluid through conduits connected to hydraulic pressure sources and by suitable control means, to be described with reference to FIG. 11. The drill bed 12 is carried on a boom, a skid, or a wheeled or tracked vehicle, not shown.

FIGS. 4 through 7

Figure 4:
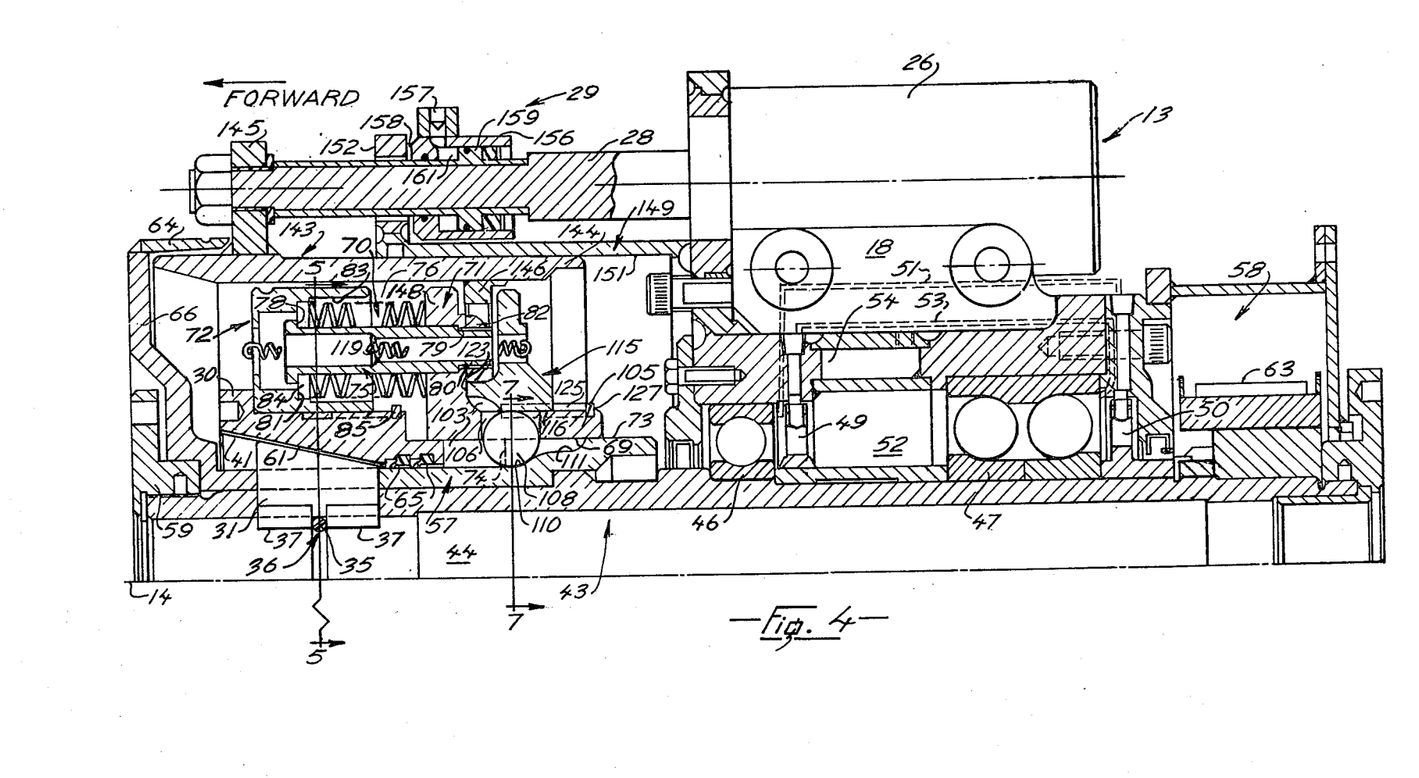
FIG. 4 is a simplified, partially-diagrammatic, longitudinal section through one-half of the drill head, jaws of a drill chuck thereof being shown in a fully extended position.
Figure 8:
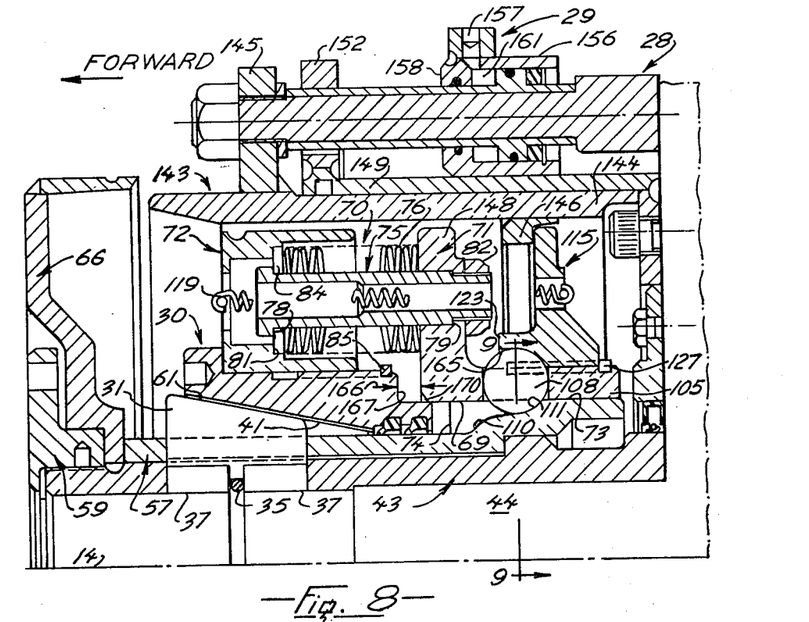
FIG. 8 is a simplified fragmented section of the drill head taken in the same plane as FIG. 4, the jaws of the chuck being shown in a fully retracted position.

The chuck 22 of the drill head includes a collet sleeve 30 and three spaced chuck jaws 31, 32 and 33, only the jaw 31 being shown in FIG. 4. A generally circular, open-ended jaw retaining spring 35 is engaged in complementary aligned recesses provided in gripping faces 37, 38 and 39 of the chuck jaws 31, 32 and 33 respectively, only the recess 36 of the jaw 31 being designated in FIG. 4. The spring is split at 34 and provides a relatively light outward force acting on each chuck jaw forcing outer faces of each jaw against a complementary female conical face 41 of the collet sleeve. The collet sleeve cooperates with the jaws so that axial sliding of the collet sleeve moves the jaws between a jaws fully extended or closed position, as shown in FIG. 4, and a jaws fully retracted or open position, as shown in FIG. 8. The spring 35 thus acts in opposition to closing forces on the jaws so as to force the jaws to the retracted position when the closing forces are removed.

Figure 5:
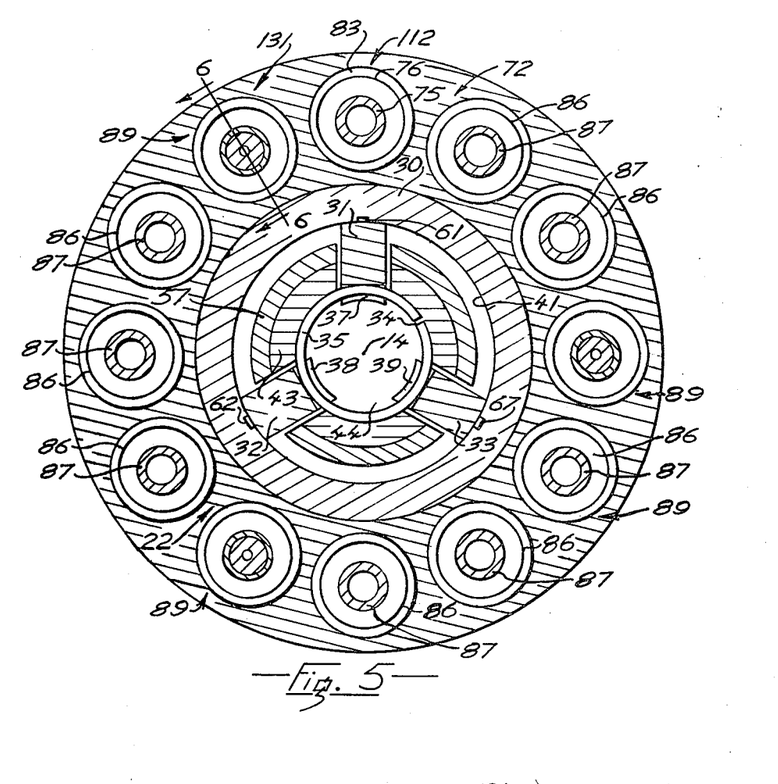
FIG. 5 is a simplified fragmented transverse section of a drill head, generally on Line 5—5 of FIG. 4.

Referring mainly to FIG. 4, the drill head 13 has an elongated spindle 43 having a central axial bore accepting the drill rod 21 therein, the drill rod being omitted in FIGS. 4 and 5. As previously stated the mounting lugs 18 and the body 20 are portions of the mounting means, which also include forward and aft bearings 46 and 47 for journalling the spindle for rotation relative to the mounting means. The bearings are lubricated by a force feed lubrication system which has an annular reservoir 52 straddled by and communicating with forward and aft impeller pumps 49 and 50. Delivery lines 51 and 53, shown diagrammatically in broken line, extend from the aft pump to the forward bearing and from the forward pump to the aft bearing respectively. When the drill is tilted, the oil flows by gravity from the reservoir to the lowermost pump, thus priming that pump and concurrently lubricating the lowermost bearing. The oil is then pumped through the appropriate delivery line to the uppermost bearing. Thus, at any instant, irrespective of drill attitude, at least one pump is immersed in oil from the reservoir, and thus at all times both bearings receive oil. A water jacket 54 surrounds the reservoir and is fed with cooling water to cool the oil if necessary.

A chuck sleeve 57 is secured to a forward end of the spindle by a flanged nut 59, forward ends of the spindle and chuck sleeve having radially disposed openings complementary to the jaws for accepting the jaws in a sliding fit therein, so that the chuck cooperates with the spindle so as to rotate therewith. An aft end of the spindle carries sprocket teeth 63 forming a portion of a transmission means 58 cooperating with the spindle 43 and extending to the motor 23 (FIGS. 1 and 2) so as to power the spindle. A pair of annular seals 65 extend between an inner portion of the collet sleeve 30 and the chuck sleeve 57 so as to reduce entry into the drill head of coolant and sludge which might otherwise seep past the collet sleeve 30. A deflector shroud 66 is integral with the chuck sleeve and thus rotates with the spindle and has a recess to accept the nut 59 to present a relatively smooth front face of the drill head. The shroud extends outwards to an outer flange 64 which encloses the drill head so as to reduce entry of coolant and sludge into the drill head. The conical face 41 of the collet sleeve has circumferentially spaced parallel sludge clearance groove 61, 62 and 67 extending between ends of the sleeve and provided adjacent the outer faces of the jaws 31, 32 and 33 respectively, as best seen in FIGS. 4 and 5. The face 41 is inclined outwards forwardly so that coolant and sludge entering the chuck and collecting at the seals 65 tend to be centrifuged outwards and forwards along the grooves in the face 41 so as to pass beyond the shroud, thus reducing contamination of the interior of the drill head. Alternatively the outer faces of the jaws can be grooved to provide the necessary clearance. Both positions of grooves provide clearance grooves between the conical face of the collet sleeve and the outer faces of the chuck jaws.

For ease of servicing, the chuck and related components are mounted at a forward end of the drill head and are more easily accessible than many similar prior art drill heads. If required, the complete chuck unit can be serviced or completely replaced by removing the nut 59, the shroud 66 and the chuck jaws and disconnecting the unit from the actuating cylinders 25 and 26.

The chuck jaws are energized by a precompressed chuck spring means 70 cooperating with first and second thrust members 71 and 72. The first thrust member is an annular lock ring, similarly designated 71, which ring is concentric with the axis 14 and carries several hollow, axially disposed studs, one stud designated 75 only being shown in FIG. 4. The ring 71 has a bore having an inner cylindrical surface 69 slidable axially on a complementary aft cylindrical surface 73 of the chuck sleeve 57, which has a forward edge 74 spaced from an aft face of the collet sleeve. The second thrust member is a forward thrust ring, similarly designated 72, the ring 72 being concentric with the axis 14 and threaded onto the collet sleeve 30. The spring means 70 is several stacks of axially compressible dished spring washers, such as Belleville washers, each stack being retained on a respective hollow stud, one stack 76 being shown in FIG. 4 carried on the stud 75. As will be described with reference to FIG. 5, the several studs and stacks of spring washers are disposed circumferentially about the collet sleeve, and extend uniformly between the lock ring 71 and the forward thrust ring 72. Also, both rings 71 and 72 are movable axially on the chuck spindle, which movement moves both ends of the spring means, thus moving the spring means bodily as will be described.

In the embodiment shown the assembly of thrust ring 72 and collet sleeve 30 coact with the chuck spring means and chuck jaws to constitute jaw actuating means.

The stud 75 has a forward shoulder 78 adjacent a forward end thereof, and an aft shoulder 79 adjacent a threaded aft end 80 thereof. The end 80 is accepted in a counterbored axial hole in the ring 71 and a locking nut 82 is threaded on the end 80 to secure the stud 75 to the lock ring 71 so that the shoulder 79 bottoms in the counterbore. A washer 84 carried on the stud serves as a forward stop for the stack of spring washers 76 which urge the washer against the shoulder 78. It is of particular importance that the spacing between the shoulders 78 and 79, thickness of the washer 84 and counterbore depth are selected so that, when the nut 82 is fully tightened, overall spacing between an aft face of the washer 84 and a forward face of the lock ring 71 is less than free length of the chuck spring means. Thus the spring means 70 is preloaded to a particular amount which is about 40 percent of maximum deflection available from the spring means. The forward thrust ring 72 has an aft facing bore 83 to accept the spring means freely therein, the bore 83 being counterbored at a forward end to provide an annular shoulder 81 adapted to receive the washer 84. Thus load from the spring washers 76 can be transferred through the washer and annular shoulder 81 to the thrust ring, thence to the collet. The washer 84 and the shoulder 78 thus serve as stop means spaced from the lock ring a distance less than free length of the chuck spring means.

The thrust ring 72 is threaded on the collet sleeve 30 to provide a range of axial adjustment of the ring 72 relative to the sleeve 30. All figures herein show the ring 72 at a forwardmost location relative to the collet sleeve which would be the desirable condition of new components. However, chuck jaw and collet sleeve wear can be accommodated to some extent by removing the chuck jaws which then permits the collet sleeve to be rotated so as to move forward relative to the thrust ring 72, a stop 85 limiting such movement between the components. This repositioning provides greater chuck jaw extension for a given position of the ring 72.

With reference to FIG. 5 only, in addition to the means 70 it can be seen that eleven further spring means extend circumferentially around the collet sleeve, eight of these spring means designated 86 being essentially identical to the means 70. Each of the means 86 has a similar associated stud, designated 87, being similar to the stud 75 and secured at aft ends thereof to the lock ring 71, not shown in FIG. 5. The spring means 86 are spaced peripherally on a pitch circle containing the means 70 and are not described further. The remaining three spring means are termed connecting means, designated 89, and are spaced equally at 120 degrees apart on the same pitch circle as the spring means 86. All the spring means are received freely in aft facing bores in the thrust ring 72, similarly to the means 70 in the bore 83.

Figures 6, 7:
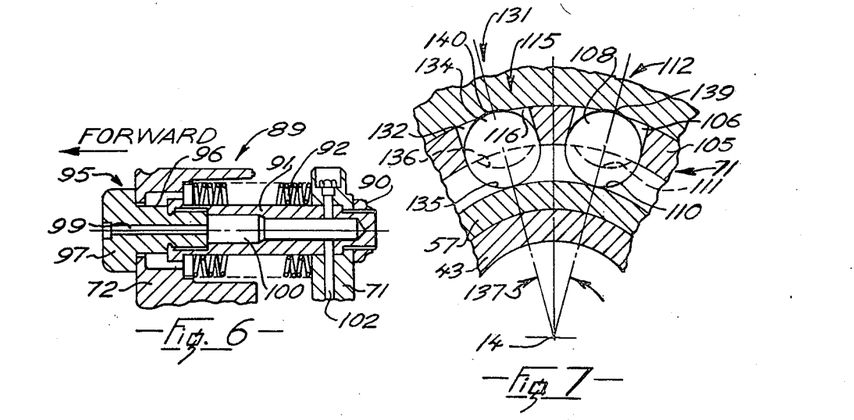
FIG. 6 is a simplified fragmented section on Line 6—6 of FIG. 5, showing a portion of chuck spring means and associated structure.
FIG. 7 is a simplified section on Line 7—7 of FIG. 4.

Referring to FIG. 6, the connecting means 89 includes a hollow stud 91 which is essentially identical to the stud 75 but has a threaded forward end. The stud 91 is secured by a lock nut 90 to the lock ring 71 and extends therefrom similarly to the stud 75. The stud 91 has a stack of spring washers 92 enclosing the stud, and thus is equivalent to the spring means 70 and 86. A stepped bolt 95 is threaded on to the forward end of the stud 91, and has a shank 96 accepted in a sliding fit in an opening in the thrust ring 72. The bolt 95 has a head 97 spaced closely to the ring 72 and adapted to be forced hard against the ring when the jaws are retracted, as will be described with reference to FIG. 8. As will be described with reference to FIG. 10, the head 97 becomes disengaged from the ring 72 when the jaws are gripping. Thus three such connecting means 89 extend from the ring 72, each being provided with associated spring means so that in a total, twelve studs and associated spring means extend between the rings 71 and 72. Such a disposition of springs provides an essentially equal circumferential distribution of axial force onto the collet sleeve for smooth and essentially jam-free chuck actuation. The bolt 95 has a lubricating passage 99 which communicates with a central passage 100 of the stud 91 and connects with a further lubricating passage 102 in the ring 72. During servicing, grease is forced along the passages 99, 100 and 102, and thence into spaces 103 between the ring and the sleeve 57 to lubricate adjacent sliding surfaces. When the spaces are filled, grease is forced fowards past the seals 65, as seen in FIG. 4 only, thus tending to purge foreign matter forwards and out from the drill head.

Referring again to FIG. 4, the lock ring 71, which is slidable axially on the chuck sleeve as previously described, is located relative to the sleeve and spindle in one of two positions by a releasable locking means to be described. The ring 71 has an inner sleeve portion 105 having a radially disposed bore 106, the bore containing a locking ball 108. The chuck sleeve 57 has a complementary pair of axially spaced forward and aft ball seats 110 and 111, each seat being complementary to the ball 108. The ball 108 is shown locked in the forward seat 110 in FIGS. 4 and 10 and corresponding to the jaws fully extended and jaws gripping positions respectively; and retained in the aft seat 111 in the FIG. 8, corresponding to the jaws fully retracted position. The seat 110 is termed a locked seat and the seat 111 an unlocked seat. Centerlines of the ball seats 110 and 111 and the ball 108 are coplanar with the centerlines of the stud 75 and associated structure within an axial plane containing the axis 14, hereinafter termed a circumferential station, which is designated 112 in FIG. 5 and is disposed at a particular angular disposition to adjacent stations.

Figures 9, 11:
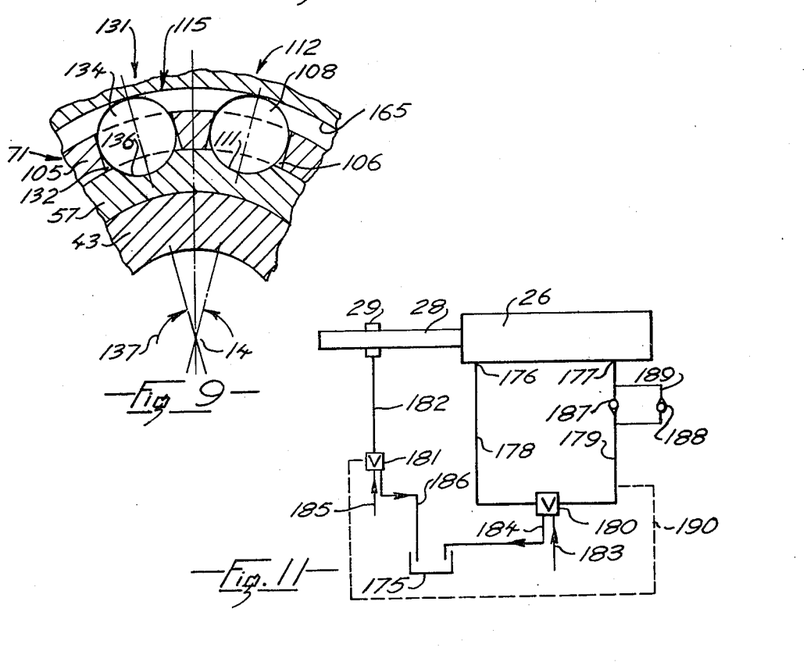

The chuck sleeve has a plurality of circumferentially spaced similar stations, suitably twelve, which correspond axially with the spring means, that is the stations are in the same axial plane as the spring means as shown in FIG. 4. However, note that there is no requirement for the balls and seats to be coplanar with or equal in number to associated spring means. Seats at two stations only are shown in FIGS. 7 and 9, but each station on the sleeve has a complementary pair of seats in the sleeve for a corresponding locking ball, with a complementary radial bore in the sleeve portion 105 of the ring 71. There are twelve locking balls located in corresponding positions, the seats in total providing a relatively large bearing area for the balls to resist force from the spring means. The seats are produced preferably with a spherical end mill having a radius equal to the locking ball radius, the balls being hardened steel balls such as are used in conventional ball bearings. A ball of 1 inch diameter is satisfactory for use with a chuck intended for use with rods having a maximum size of about 2 3/16 inches. The balls also key the ring 71 to the chuck sleeve 57 to maintain axial alignment therebetween to ensure that the spring means does not rotate relative to the chuck spindle, which would cause the spring means effectively to twist relative to the axis 14.

A ball retaining ring 115 cooperates with the inner sleeve portion 105 and has a first inner cylindrical surface 116 slidable axially on the sleeve portion 105. The ring 115 is concentric with the lock ring and is mounted on a side of the lock ring remote from the thrust 72, and cooperates with the locking balls as will be described. A relatively light tension spring 119 extends through the hollow stud 75 and has opposite ends retained on pins carried in the rings 72 and 115 so as to connect resiliently the forward thrust ring 72 to the retaining ring 115. Tension in the spring 119 forces the ring 115 forward until a forward portion 123 of the ring 115 contacts the ring 71. The inner cylindrical surface 116 of the ring 115 cooperates with the ball to locate and retain the ball on the aft seat 111. Note that when the jaws are retracted the ring 115 interferes with the ball only, and is clear of the ring 71 as will be described with reference to FIGS. 8 and 9. In both positions of the rings 71 and 115, the ring 115 cooperates with the ball to urge the ball into its respective seat, which is dependent on the lock ring position. A key 125 (broken outline) cooperates with the ring 115 and the sleeve portion 105 to prevent relative rotation therebetween to prevent lateral forces on the tension spring 119.

Referring again to FIG. 5, at each circumferential station on the drill head, the hollow stud 87 corresponding to the stud 75 has a similar tension spring (not shown) extending therethrough to pull the ball retaining ring 115 toward the lock ring 71. Thus there are nine such tension springs spaced around the rings. Note that the three studs 91 of the connecting means 89 do not have springs and these studs are provided with the previously described passages for lubrication purposes. As seen in FIG. 4, an aft end of the inner sleeve portion 105 has a circumferential groove to retain an annular spring clip 127 therein, which serves as an aft stop to limit aft movement of the ring 115 relative to the sleeve portion 105 as will be described. When the drill is operating the rings 71, 72 and 115 rotate with the spring means and collet sleeve.

Referring to FIG. 7, two circumferential station on the sleeve 57 and the sleeve portion 105 are shown, namely the station 112 and an adjacent second station 131 relating to the connecting means 89. The sleeve portion 105 has a second bore 132, containing a second locking ball 134 of the plurality of balls. To receive the second ball 134, the sleeve 57 has complementary second forward and aft seats 135 and 136, the seat 136 shown in broken outline. Centers of the balls 108 and 134 subtend an angle 137 at the axis 14, which angle represents angular separation between the balls which, for twelve equally spaced balls, is 30 degrees. The balls and seats provide a releasable circumferential location or locking means for lock ring 71 relative to the chuck sleeve 57 as will be described. As can be seen, the first inner cylindrical surface 116 of the retaining ring 115 contacts outer surfaces of the balls 108 and 134, which, with the bores 106 and 132, retains the balls in the respective seats. The surface 116 has parallel axially disposed cylindrical ball grooves 139 and 140 at the stations 112 and 131 respectively, the grooves being relatively shallow, for example about 0.015 inches deep. Each station has similar grooves which provide a relatively large bearing area to resist forces exerted on the surface 116 by the balls.

Referring again to FIG. 4, an actuating member 143 has a sleeve portion 144, having a lug 145 cooperating with the piston rod 28 of the cylinder 26, and an actuating ring 146 extending inward from the sleeve portion 144. When the drill is operating, the ring 146 is disposed between and spaced clear from an outer portion 148 of the lock ring 71 and the retaining ring 115. As can be seen, actuation of the cylinder 26 moves the member 143 axially within the sleeve 149, which movement moves the ring 146 to contact either the ring 71 or the ring 115, so as to actuate the chuck. The disengaging cylinder 29 is provided to disengage the ring 146 from either the rings 71 or 115 to provide necessary clearance as will be described.

Thus the actuating cylinder 26 and the rod 28 thereof, the member 143 and the actuating ring 146 thereof serve as chuck actuating means supported on the drill head mounting means and cooperating with the first thrust member. The chuck actuating means moves the first thrust member relative to the spindle between the jaws retracted and jaws extended positions in response to movement of the actuating means, thus overcoming force from the spring means to apply closing force to the jaws. The ring 146 has a forward face serving as a first engagement means to engage the first thrust member, and an aft face serving as a second engagement means to engage the retaining means, the faces being positioned to avoid interference when the drill is operating. The ring 146 is stationary when the drill is operating and thus the clearance above is required to permit rotation of the chuck with no interference between the rings 146, 71 and 115 as will be described. A guide sleeve 149 extends from the body 20 and has an inner surface 151 complementary to an outer surface of the sleeve portion 144 of the actuating member 143 to permit free axial sliding therebetween.

An outer end of the sleeve 149 has a flange 152 having a bore which accepts the rod 28 for free sliding therein. The disengaging cylinder 29 is effectively a short stroke hydraulic jack having a cylinder body 156 carried on the piston rod, the body having an intake port 157 and a cylinder head 158 adjacent the flange 152. The cylinder has a piston 159 carried on the rod 28, a forward face thereof with the cylinder head 158 defining in part a chamber 161 within the cylinder, which chamber communicates with the port 157 as shown. The cylinder 29 is mounted on the rod 28 so that, when retracted, that is when the chamber 161 is below maximum volume, full extension of the rod 28 from the cylinder 26 causes the cylinder head 158 to contact an opposed aft face of the flange 152. This position is not illustrated. From this fully extended position of the rod 28, actuation of the cylinder 29, that is expansion of the chamber 161, results in an aft force on the rod 28 causing slight retraction of the rod, which results in a corresponding aft movement of the member 143. As will be described, the aft movement disengages the actuating ring 146 from the lock ring 71 resulting in the relative positions as shown in FIG. 4. A hydraulic circuit associated with the cylinders 26 and 29 to actuate and to lock the chuck is to be described with reference to FIG. 11. The cylinder 29 thus serves as a disengaging means cooperating with the chuck actuating means to retract the chuck actuating means from engagement with the first thrust member so as to permit rotation of the chuck without interference between the chuck actuating means and the first thrust member.

Figures 10, 12:
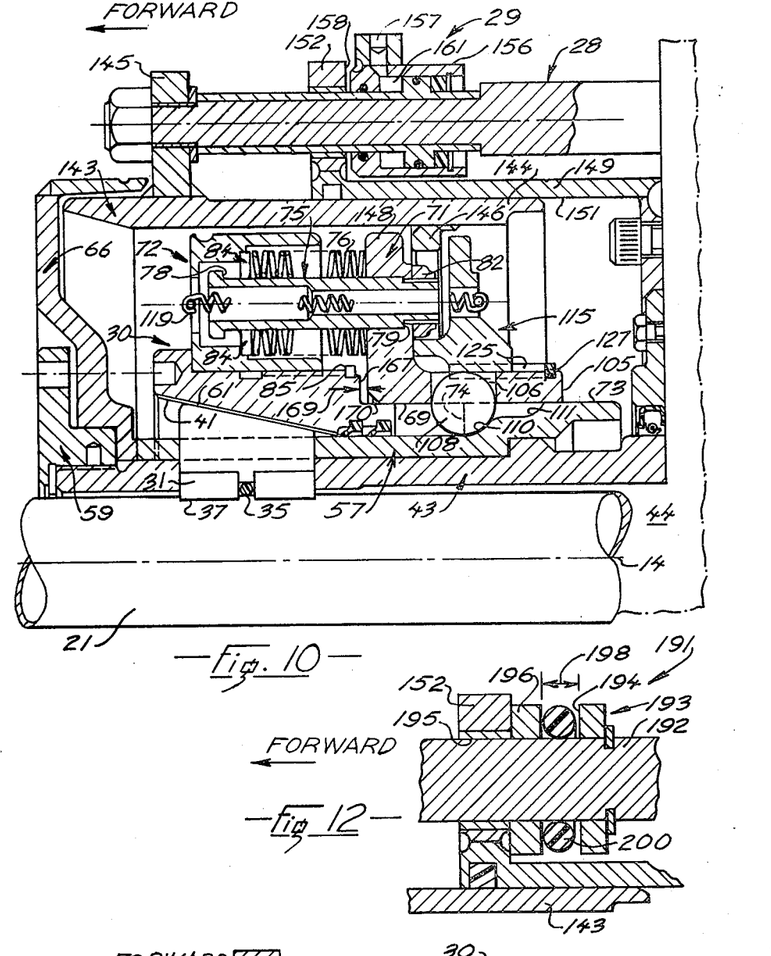
FIG. 10 is a simplified section of the drill head taken in the same plane as FIG. 4, the jaws of the chuck being shown gripping a drill rod held within the chuck, FIG. 11, which is shown on Sheet 4 of the drawings, is a simplified schematic showing portions of a hydraulic control circuit for actuating the chuck jaws and for actuating a hydraulic disengaging means for permitting free rotation of the drill chuck.
FIG. 12 is an alternative mechanical disengaging means for permitting free rotation of the drill chuck.

FIGS. 8 through 10

Referring to FIG. 8 the piston rod 28 is shown retracted so as to draw the cylinder 29 aft, the actuating ring 146 being forced into contact with the retaining ring 115 to move the ring 115 aft. The jaw 31 is shown in a fully retracted position in which the lock ring 71 has moved aft relative to the chuck sleeve 57, and is located aft by the locking ball 108 seated in the unlocked seat 111. The ball retaining ring 115 locates the ball on the seat 111 and is urged against the ball by the tension spring 119.

As the lock ring 71 moves aft towards the above-described position, the three connecting means 89 (FIG. 6) draw the forward thrust ring 72 aft also. The collect sleeve 30 is thus drawn aft, permitting retraction of the chuck jaw 31 under the influence of the outward force of the jaw retaining spring 35. In this position the largest diameter tool, the drill reaming shell, can be passed through the axial bore 44 of the spindle with no interference with the chuck jaws. Note that if the chuck were rotated when the lock ring 71 is in this position there would be relative sliding between the ball retaining ring and the actuating ring 146, resulting in undesirable interference.

Referring also to FIG. 9, the balls 108 and 134 are shown located on the seats 111 and 136 respectively. The balls are retained in the aft seats by a second inner cylinder surface 165 of the ring 115 locating the balls 108 and 134 within the respective bores 106 and 132. As forces from the balls on the ring 115 in this position are considerably less than in the jaw gripping position, ball grooves are not provided in the surface 165. This contrasts with the first surface 116 which contacts the balls in the jaws extended position.

In FIG. 10 the drill rod 21 is shown gripped by the chuck jaw 31, the jaws 32 and 33, which are not shown in FIG. 10, concurrently gripping the rod at 120 degree circumferentially spaced positions as shown in FIG. 5. As will be described, the rod 28 has been extended thus moving the actuating member 143 forward, resulting in forward movement of the lock ring 71 relative to the collet sleeve 30. The ball 108 is located on the locked ball seat 110, and is retained therein by the ball retaining ring 115 which is positioned similarly to its position as shown in FIG. 4. The actuating ring 146 has been moved clear of the rings 71 and 115 by the disengaging cylinder 29 so as to permit rotation of the chuck, the chuck spring means, and associated rings, etc., without interference with the stationary ring 146. The retaining ring 115 thus serves as a retaining means which cooperates with the first thrust member and the locking ball to locate the first thrust member in the jaws extended position, which relieves the chuck actuating means of thrust from the chuck spring means during operation of the drill.

A major difference between positions of the moving components in the jaws non-gripping conditions, that is fully extended or retracted, and the jaws gripping condition is as follows. In FIG. 4, in which the jaws are fully extended, and in FIG. 8, in which the jaws are fully retracted, the chuck spring means 70 is compressed between the washer 84 and the lock ring 71, the washer 84 is forced against the forward shoulder 78 and the stud 75 is subjected to tensile stress due to the spring means 70. Thus, when the jaws are retracted or are fully extended and not gripping, the stud 75 serves effectively as a tension means cooperating with the chuck spring means to resist the compression force from the chuck spring means. In FIG. 10, in which the jaws are gripping the drill rod, the springs are compressed between the rings 71 and 72, and the forward shoulder 78 of the stud 75 is clear of the washer 84. Thus force of the spring means is transferred through the washer 84 onto the thrust ring 72, and the stud 75 is then relieved of load from the spring means. The force from the spring means 70 on the thrust ring 72 is transferred through the collet sleeve to the chuck jaws to grip the rod as shown in FIG. 10. Note that as the jaws are brought into engagement with the rod, a minimum gripping force is immediately available when the studs are relieved of tensile force.

As can be seen in FIG. 8, when the jaws are fully retracted, a gap 166 exists between an aft facing shoulder 167 of the collect sleeve 30 and a forward face of the lock ring 71. As seen in FIG. 10, forward movement of the ring 71 is not reflected by a similar movement of the collect sleeve because inwards movement of the chuck jaws is limited by the drill rod. Thus the ring 71 moves forward relative to the collet sleeve by sliding on the surface 73, which results in a closing of the gap between the shoulder 167 and ring 71 to assume a much smaller gap 169 of FIG. 10. The ring 71 has a chamfered forward edge 170 which ensures relatively unrestricted axial movement of the ring 71 over an aft portion of the collect sleeve. The gap 166 of FIG. 8 represents approximately the movement of the lock ring 71 relative to the collect sleeve 30 for gripping a rod of maximum diameter, i.e. when the jaws move inwards a minimum amount from the fully retracted position to grip a maximum diameter rod so exerting maximum grip. Note that FIG. 10 shows relative position for components with negligible wear. Other factors remaining constant, note that wear on the face 41 of the collet sleeve, the engaging faces of the chuck jaws, or the rods themselves would result in an increase in the gap 169 of FIG. 10. As previously stated, by removing the chuck jaws the sleeve 30 can be rotated so as to move forward relative to the thrust ring 72 to accommodate such wear, the limit of such movement being the stop 85. This would effectively increase the gap 169 of FIG. 10, other factors remaining constant. Thus, even with worn components, sufficient grip can be attained.

FIG. 11

As previously stated, the actuating cylinder 26 is a single rod, double-acting hydraulic cylinder and has ports 176 and 177 communicating through lines 178 and 179 with a manually operated chuck actuating valve 180. The chuck actuating valve is a four-way, three-position valve receiving pressurized hydraulic fluid from a delivery line 183 connected to a hydraulic pressure source, not shown. The valve returns scavenged fluid through a scavenge line 184 connected to a sump 175. The cylinder 26 and the opposite cylinder 25, shown in FIGS. 2 and 3 only, are actuated between fully retracted and fully extended positions according to one of two outer positions of the valve 180, so as to extend or retract the chuck jaws respectively. The valve 180 has a spring-return central neutral position in which the delivery line 183 is blanked off and the lines 178 and 179 are interconnected to the sump to permit free movement of fluid from either side of the piston of the cylinder 26, which thus "floats". The disengaging cylinder 29 is actuated automatically by a disengaging valve 181 connected thereto by a line 182. The valve 181 is a spring opened, two-position, four-way, pilot pressure controlled valve receiving pressurized fluid from an input line 185 and returning scavenged fluid to the sump 175 through a scavenge line 186, and is opened when the piston of the cylinder 26 is floating as will be described.

As described with reference to FIG. 10, when the drill is operating, that is the chuck jaws are gripping and rotating a drill rod, the actuating ring 146 is held clear of the lock ring 71 and the ball retaining ring 115. To prevent a tendency for the rod 28 to creep when floating, or to be moved by the external forces acting on the lug 145, one way check valves 187 and 188 are fitted as shown in the line 179 and in a short parallel line 189 connected in parallel with the line 179 as shown. The check valves are set to open under a relatively low pressure, for example between 15 and 20 pounds per square inch, so as to open easily for normal chuck actuating cylinder flow. However should an external force act on the rod 28 to generate a low pressure in one line, e.g. less than 15 pounds per square inch, the rod does not creep as the check valves do not open. Such an arrangement thus ensures that the actuating ring 146 cannot accidentally be moved into contact with the rings 71 or 115 when the valve 180 is centralized after the chuck has been extended.

A pilot pressure line 190, shown in broken outline, connects the line 179 to the valve 181 so that the valve 181 is thus responsive to pressure in the line 179. The valve 181 is closed when under pressure used to actuate the chuck, and is opened when pressure in the pilot line drops below a particular pre-set value, about 100 pounds per square inch. Thus, when the cylinder 26 is supplied with fluid through the line 179, the valve 181 remains closed and the rod 28 extends fully. When the valve 180 is centred so that the piston of the cylinder 26 floats, pressure in the line 179 drops below the pre-set value and the valve 181 thus opens to actuate the disengaging cylinder 29, so as to partially retract the rod 28 to disengage the chuck actuating means. The disengaging cylinder 29 remains open to pressurized fluid until the actuating cylinder is again fully extended to grip the drill rod.

OPERATION

To extend the jaws from the fully retracted position as shown in FIG. 8 to grip the rod 21 as shown in FIG. 10, the following sequence takes place. The operation is described in part for components of the drill at the station 112 and the adjacent station as shown, operation of the remaining components being identical.

Referring initially to FIG. 8, the cylinder 26 is actuated so that the rod 28 extends, moving the lug 145 of the member 143 forward until the actuating ring 146 contacts the lock ring 71. Initially the ball 108 is on the unlocked seat 111 and forward movement of the ring 71 moves the ball off the seat 111 to roll foward and inward to approach the seat 110, concurrently being followed by the retaining ring 115 which is pulled foward by the tension spring 119. Forward movement of the ring 71 is transferred through the stack of spring washers 76 to the thrust ring 72 which forces the collet sleeve 30 forward to commence inwards extension of the jaws. When the jaws firmly contact the drill rod 21, the inward movement of the jaws is stopped, which correspondingly stops forward motion of the collet sleeve. At this position, force exerted on the collet sleeve by the stack of spring washers 76 is relatively low and is less than the initial pre-compression force because the washer 84 is still urged against the forward shoulder 78.

The collet sleeve 30 stops moving before the ball 108 has reached the inner seat, which position is not shown, and thus further forward movement of the ring 71 commences further compression of the stack of spring washers. The ring 71 continues to move forward until the ball 108 engages the seat 110, which engagement occures before the forward face of the ring 71 contacts the shoulder 167. At this position the ball 108 can be positioned slightly forward of the seat 110, i.e. the ball has over-travelled, which position is not illustrated. When actuation of the cylinder 26 ceases and the chuck actuating valve 180 controlling the cylinder 26 is centralized so that the piston can float, as aforesaid, resilience in the stack of spring washers would cause slight aft movement of the ring 71 permitting the ball 108 to engage fully the seat 110. The final foward movement of the lock ring 71 as above compresses the stack of spring washers 76 so that the shoulder 78 moves forward from the washer 84 and the stud 75 is released of tensile load from the springs, which load is simultaneously transferred to the collet sleeve, thence to the chuck jaws. Correspondingly, when the jaws grip the rod, the head 97 of the bolt 95 of FIG. 6 is clear of the thrust ring 72.

The actuating ring 146 remains in contact with the lock ring 71, which is not shown, until the disengaging cylinder 29 is actuated by the valve 181 (FIG. 11) in response to the low pressure in the line 179, when the delivery line 183 is closed. The line 185 then supplies fluid to expand the chamber 161 so as to move the rod 28 aft an amount sufficient to disengage the ring 146 from the ring 71. The valve 181 closes when the pressure in the line 179 exceeds the pre-set value, which would occur when the cylinder 26 is again extended to close the chuck jaws. Note that loss in delivery pressure would not result in movement of the actuating cylinder and thus the jaws would continue gripping the rod. Thus the drill head is fail-safe with regard to hydraulic pressure losses. The position as shown in FIG. 10 is thus attained and the chuck and rings can rotate without sliding contact between the ring 146 and the rings 71 and 115. Note that reaction of force from the spring means 70 is borne by the ball 108 engaging the forward seat 110 and is not transmitted to the bearings 46 and 47, which contrasts in this regard with some common drill heads. Upwards movement of the ball 108 off the forward seat 110 is restricted by the ball retaining ring 115 which thus serves as retaining means cooperating with the ball to retain the ball when required in the jaws extended or gripping positions.

Note that the force from the spring means acting on the thrust ring is increased from the pretensioning force in the jaws retracted position of FIG. 9 by an amount approximately proportional to decrease in spacing between the rings 71 and 72. In the example described, total radial movement of each chuck jaw from an extended to retracted position is about 0.1875 inches. This is attained with a stack of spring washers having a relaxed length of 2.56 inches, a normal pretensioned length of 2.20 inches and a minimum compressed length for maximum force of 1.91 inches. This provides a working deflection of 0.294 inches, that is a normal working range of 42% to 75% of maximum possible deflection.

To retract the chuck jaws from the position shown in FIG. 10, the cylinder 26 is actuated and the rod 28 is retracted, thus moving the actuating member 143 and the ring 146 aft. The ring 146 is brought into contact with the ring 115 moving the ring 115 aft and simultaneously partially uncovering the ball 108, thus permitting the ball to commence to roll upwards and aft off the seat 110. This unlocks the lock ring 71 which in response to force from the spring means 70 moves aft following the ball. Further aft movement of the ring 115 permits the ball 108 to attain the unlocked seat 111, being followed simultaneously with aft movement of the lock ring 71. Initial aft movement of the ring 71 reduces force on the thrust ring 72 so as to tend to loosen grip on the drill rod. However, it is likely that the ring 72 does not move aft until the head 97 of the ring 72 contacts the ring 72 to provide a positive force aft on the ring 72. The bolt 95 draws the ring 72, and simultaneously the collet sleeve 30, aft with the corresponding retraction of the chuck jaws resulting from outwards force from the spring 35. As can be seen, the retaining ring is thus a retaining means cooperating with the chuck actuating means and is movable therewith to release the lock ring to permit the ring 71 to move from the jaws extended to jaws retracted positions, thus permitting retraction of the jaws.

If the jaws are fully extended, but not gripping a rod as shown in FIG. 4, the spring means is pre-compressed by the studs 75 and 91 and there are negligible external forces acting on the ring 71. When the retaining ring 115 is moved aft there is no force available from the spring means to move the unlocked lock ring 71 aft. Thus, the ring 146 moves the ring 115 aft by itself and the ball remains on the seat 110 until aft movement of the ring 115 relative to the lock ring 71 is limited by interference between the ring 115 and the clip 127. Force on the clip 127 thus pulls the ring 71 aft independently of force from the spring means 70, which disengages the ball from the seat 110. Note that the ring 115 prevents the ball moving off the seat 111 as the ring 115 moves aft by itself.

Thus summarizing, as can be seen from above, the lock ring 71 and the thrust ring 72 cooperate with the precompressed chuck spring means and serve as first and second thrust members which are movable axially relative to the chuck spindle. The first thrust member is movable between the jaws retracted and jaws extended positions and the second thrust member cooperates with the collet sleeve and chuck jaws. The studs 75, 87, etc. serve as tension means extending from the first thrust member to precompress the chuck spring means when the first thrust member is in the jaws retracted position. It is the use of such tension means to precompress the spring means which permits easy bodily movement of the spring means in its entirety with the ring 71 to apply force to the ring 72 and thus the collet sleeve. This bodily movement results from simultaneous movement of both ends of the spring means in the same direction, which contrasts with movement of merely one end of the spring means in many prior art devices. Such movement permits extensive retraction of jaws permitting the relatively wide opening of the chuck jaws.

As can be seen the locking balls serve as detent means movable between the jaws extended and jaws retracted positions and cooperating with the ring 71 and retaining ring 115 to hold the ring 71 in the jaws extended position. In the jaws extended position, the detent means cooperate simultaneously with the locked seat 110, which serves as a first detent location means in the spindle, and the bore 106 in the ring 71 which serves as a second detent location means in the first thrust member. Thus the first thrust member is restricted against axial movement relative to the spindle, so that the chuck spring means act on the collet sleeve forcing the jaws towards the closed position. In the jaws retracted position, the detent means locates the first thrust member relative to the spindle and forces from the spring means are sustained by the tension means, thus reducing force on the chuck jaws and permitting retraction of the jaws.

ALTERNATIVES AND EQUIVALENTS

The detent means are shown to be a plurality of releasable locking balls which engage complementary seats of the chuck spindle and corresponding bores in the lock ring 71. Clearly other detent means and complementary locating means in the spindle can be devised that are within the invention. The spring means are shown to be a stack of dished spring washers, however compression coil springs and other axially compressible spring means can be substituted. The chuck actuating means, that is the actuating cylinders 25 and 26, are shown to be hydraulic cylinders, however, other means of moving the actuating member 143 can be devised and substituted.

In the previously described embodiment, the actuating ring 146 is moved out of engagement with the rings 71 or 115 by the disengaging cylinders 29, the latter serving as a hydraulic disengaging means. An alternative mechanical disengaging means is described with reference to FIG. 12. Also, the chuck jaws 31 through 33 as previously described, can be prone to jamming if there is excessive build up of dirt or lack of lubrication in the jaws. Alternative chuck jaw structure is described with reference to FIG. 13.

FIG. 12

An alternative disengaging means 191 is substituted for the disengaging cylinder 29 of FIG. 1, and thus the valve 181 and lines 182, 185, 186 and 190 of FIG. 11 are eliminated. An alternative piston rod 192 is substituted for the rod 28 of the cylinder 26 (not shown) and has a ring 193 secured thereto to provide a forward facing shoulder 194. The flange 152 of the guide sleeve 149 has a bore 195 and a washer 196 to accept freely the rod 192 therein, so that when the rod 192 is extended a space 198 exists between the shoulder 194 and an aft face of the washer 196. A resilient "O" ring 200 having a cross-sectional diameter greater than the space 198 encircles the rod 192 and is fitted in the space 198 between the shoulder and the washer. Thus upon full extension of the rod to move the actuating member 143 to a maximum forward position, the ring 200 is compressed between the shoulder 194 and the washer.

This structure is used in a hydraulic control circuit using only the valve 180 and associated lines of FIG. 11 and when the hydraulic pressure in the cylinder 26 is released by centering the manual valve 180, resilience in the ring 200 moves the rod 192 a small distance aft. This effectively retracts the rod a small amount sufficient to disengage the actuating ring 146 from the lock ring 71 of FIGS. 4, 8 and 10 to permit rotation of the chuck and associated components without rubbing of the ring 146 on the ring 71.

Figure 13:
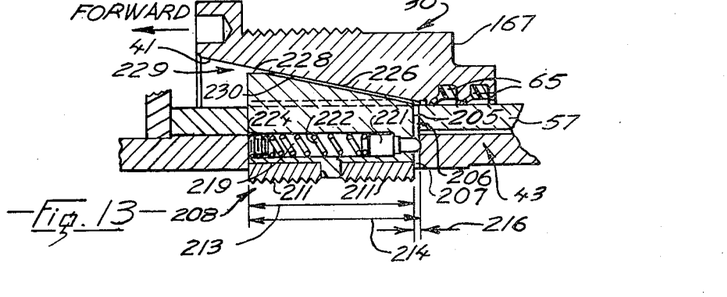
FIG. 13 is a simplified section through an alternative chuck jaw.

FIG. 13

The collet sleeve 30 is shown carried on the chuck sleeve 57 and spindle 43, annular seals 65 extending therebetween similarly to the previously described embodiment. The chuck sleeve and spindle have aligned rectangular openings 206 and 207 respectively, carrying therein an alternative chuck jaw 208 which cooperates with two similar alternative jaws (not shown) spaced on opposite sides of the chuck spindle, similarly to the jaws 32 and 33 of FIG. 5. The chuck jaw 208 has a gripping face 211 provided with hardened inserts, but the jaw retaining spring is eliminated as the jaw is retained in the respective opening by alternative means. The jaw has an axial length 213 defined as space between forward and aft end faces thereof which is shorter than axial length 214 of the opening 206. The jaw tapers towards the aft end face 205 and has an outer face 226 complementary to and adjacent the collet sleeve. The jaw has an axial bore 219 extending inwards from the aft end face thereof, and a bull-nosed, spring-loaded pin 221 is a sliding fit at an aft end of the bore as shown. The pin extends aft from the aft end face of the jaw and has a shoulder limiting aft movement of the pin. The pin is forced aft by a compression spring 222 retained within the bore and compressed between a threaded plug 224 at a forward end of the bore and the pin.

When the jaws are not gripping the rod, the spring-loaded pin urges the chuck jaw to a forward end of the openings 206 and 207, to produce an axial clearance 216 at the aft end of the opening and jaw as shown. When the drill rod is gripped by the jaws, and drilling commences, which condition is not shown, a reaction to drilling generates an axial force on the drill rod in an aft direction and in opposition to force from the pin. This results in slight aft movement of the jaw relative to the collet sleeve which, due to the angle of the face 41 of the collet sleeve, increases inwards force on the jaw thus increasing gripping force of the jaw. Thus the spring-loaded pin permits a slight aft movement of the jaw which augments gripping force on the drill rod, i.e. the jaw is partially self-energizing. Note that the spring-loaded pin holds the jaw in the opening and thus the jaw retaining spring 35 of FIGS. 4 and 5 is eliminated.

The outer tapered face 226 of the jaw is chamfered at 228 at a forward end thereof, resulting in a tapering gap 229 between the conical face 41 and the chamfer 228. The gap 229 can accept a slotheaded screw driver for loosening the jaw 208 to assist removal of the jaw from the chuck.

As can be seen the chuck jaw above described can be directly substituted for the jaws 41 through 33 of the FIG. 4 embodiment. A sludge clearance groove 230 provided in the outer face 226 of the jaw is substituted for and is equivalent to the groove 61 of FIG. 4.

I claim:
1. A drill head for a core sampling drill, the drill head including an elongated powered spindle with a central axial bore to accept a drill rod, and a drill chuck cooperating with the spindle, the chuck having chuck jaws movable inwards to grip the drill rod for rotation about a drill rod axis, the drill head being characterized by:
   a. first detent location means associated with the spindle,
   b. a first thrust member movable between jaws retracted and jaws extended positions,
   c. detent means movable between jaws retracted and jaws extended positions, the detent means being generally complementary to the detent location means to cooperate with the spindle and the first thrust member to hold the first thrust member in the jaws extended position,
   d. pre-compressed chuck spring means cooperating with the first thrust member and jaw actuating means so as to be movable in its entirety with the first thrust member,
the detent location means, the first thrust member, the detent means and the chuck spring means being adapted to rotate with the chuck and spindle, the drill head further including:
   e. a chuck actuating means which is rotationally stationary as the drill head rotates, the chuck actuating means cooperating with the first thrust member to move the first thrust member relative to the spindle from the jaws retracted position to the jaws extended position thus further compressing the spring means to apply closing force through the jaw actuating means to the chuck jaws, the chuck actuating means being disengaged from the first thrust member during operation of the drill to prevent interference therebetween.

so that in the jaws retracted position of the first thrust member the detent means are disengaged from the detent location means and the spring means is precompressed and positioned to permit the jaws to retract to permit relatively large diameter tools to pass the chuck jaws, and in the jaws extended position of the first thrust member the detent means engage the detent location means to locate the first thrust member relative to the spindle and the spring means are repositioned with the first thrust member so that the spring means are further compressed to cooperate with the chuck jaws to extend the jaws inwards to grip the drill rod.

2. A drill head as claimed in claim 1 further including:
   a. a retaining means adapted to rotate with, and to cooperate with, the detent means to locate the first thrust member in the jaws extended position as required, so as to relieve the chuck actuating means of thrust from the chuck spring means during operation of the drill,
   b. the chuck actuating means is positioned to cooperate with the first thrust member and the retaining means and has means to disengage the retaining means as required, so as to permit the detent means to become disengaged from the spindle to permit the first thrust member to move relative to the spindle for retraction of the chuck jaws.

3. A drill head as claimed in claim 1 in which the spring means is characterized by:
   a. tension means extending from the first thrust member to precompress the chuck spring means when the first thrust member is in the jaws retracted position, and the drill head is further characterized by:
   b. a second thrust member cooperating with the chuck jaws, so that when the first thrust member is in the jaws extended position and a drill rod is between the chuck jaws, the spring means cooperates with the second thrust member and applies a force to close the chuck jaws on the drill rod, and the tension means is then relieved of load from the chuck spring means.

4. A drill head as claimed in claim 1 characterized by:
   a. disengaging means cooperating with the chuck actuating means to retract the chuck actuating means from engagement with the first thrust member, thus permitting rotation of the chuck without interference between the chuck actuating means and the first thrust member.

5. A drill head for a core sampling drill adapted to be supported on a drill bed having a drill head feed means, the head having a longitudinal axis and being adapted for movement along the axis by the feed means, the drill head having a chuck concentric with the axis and being adapted to grip an elongated drill rod for rotating the drill rod about the longitudinal axis, the chuck including a collet sleeve and a plurality of chuck jaws, the collet sleeve cooperating with the jaws so that axial movement of the sleeve moves the jaws between jaws extended and jaws retracted positions; the drill head including:
   a. an elongated spindle having a central axial bore concentric with the longitudinal axis for accepting the drill rod therein, the spindle being rotated about the longitudinal axis, the chuck cooperating with the spindle so as to rotate therewith, the spindle having first detent location means,
   b. drill head mounting means cooperating with the drill feed means and adapted for longitudinal movement relative to the drill bed, the mounting means being adapted to carry means for rotating the spindle and further including bearings for journalling the spindle for rotation relative to the mounting means,
   c. first and second thrust members being movable axially relative to the spindle, the first thrust member being movable between jaws retracted and jaws extended position and having second detent location means, the second thrust member cooperating with the collet sleeve,
   d. precompressed chuck spring means movable with the first thrust member to apply force to the second thrust member which changes force on the collet sleeve,
   e. detent means movable between jaws extended and jaws retracted positions; in the jaws extended position the detent means cooperate simultaneously with the first detent location means in the spindle and the second detent location means in the first thrust member so that the first thrust member attains the jaws extended position and is restricted against axial movement relative to the spindle so that force from the chuck spring means acts on the collet forcing the chuck jaws towards the extended position; in the jaws retracted position the detent means are relocated relative to the spindle and the first thrust member so that force applied to the chuck jaws is reduced from that when the detent means are in the jaws closed positions, thus permitting retraction of the jaws,
   f. retaining means cooperating with the detent means to retain the detent means when required in the jaws closed position, thus locating the first thrust member in the jaws extended position, the first and second thrust member, the chuck spring means, the detent means and the retaining means being adapted to rotate with the spindle and the chuck; the drill head further including:
   g. chuck actuating means supported on the drill head mounting means, the chuck actuating means cooperating with the first thrust member to move the first thrust member relative to the chuck spindle between the jaws retracted and jaws extended positions, so that when the chuck actuating means moves to the jaws extended position the first thrust member is moved relative to the second thrust member to the jaws extended position thus increasing force on the collet sleeve, and simultaneously the detent means is moved to the jaws extended position and is retained therein by the retaining means; and when actuating force on the actuating means is released the actuating means and first thrust member are disengaged to permit rotation between the first thrust member and the actuating means with no contact therebetween, the first thrust member remaining in the jaws extended position; and when the chuck actuating means are actuated to move from jaws extended position to the jaws retracted position the chuck actuating means engages the retaining means and moves the retaining means so that the detent means are released from the jaws extended position, permitting movement of the first thrust member to release spring forces on the collet thus permitting retraction of the jaws.

6. A drill as claimed in claim 5 in which:
i. tension means extend from the first thrust member and cooperate with the chuck spring means so as to precompress the spring means when the first thrust member is in the jaws retracted position; and when the first thrust member is in the jaws extended position and a drill rod is between the chuck jaws, the spring means cooperates with the second thrust member and applies force to close the chuck jaws on the drill rod, and the tension means is then relieved of load from the chuck spring means.

7. A drill head as claimed in claim 6 in which:
i. the first thrust member is an annular lock ring concentric with and movable along the drill rod axis in response to the movement of the chuck actuating means,
ii. the tension means includes a plurality of studs extending axially from the lock ring, each stud having a stop means spaced from the lock ring a distance less than free length of the chuck spring means,
iii. the chuck spring means includes a plurality of axially compressible springs enclosing the studs and spaced between the stop means and the lock ring, so that in the jaws retracted position of the lock ring each spring means is compressed between the respective stop means and the lock ring, and in the jaws extended position of the lock each spring means is compressed between the second thrust member and the first thrust member, thus relieving load from the stop means and thus from the tension means and transferring load to the second thrust member to apply closing force to the jaw members.

8. A drill head as claimed in claim 7 in which:
i. the retaining means is a retaining ring concentric with, and mounted for axial sliding on, the lock ring on a side of the lock ring remote from the second thrust member, a portion of the retaining ring cooperating with the detent means, the drill head further including:
ii. tension spring means extending between the second thrust member and the retaining ring to urge the retaining ring toward the lock ring to retain the detent means in an appropriate location.

9. A drill head as claimed in claim 8 in which:
i. the second thrust member is releasably adjustable for axial positioning relative to the collet sleeve to accommodate wear of the chuck.

10. A drill head as claimed in claim 8 in which:
i. the spindle has spaced locked and unlocked seats complementary to the detent means to receive the detent means in the jaws extended and in the jaws retracted positions respectively,
ii. the detent means is rollable between the seats.

11. A drill head as claimed in claim 5 further including:
i. disengaging means cooperating with the chuck actuating means to retract the chuck actuating means from engagement with the first thrust member so as to permit rotation of the chuck without interference between the chuck actuating means and the first thrust member.

12. A drill head as claimed in claim 5 in which the chuck actuating means includes:
i. an extensible and retractable fluid actuated chuck actuating cylinder extending from the mounting means,
ii. an actuating member having a sleeve enclosing the spring means, the first and second thrust members and the retaining means, and cooperating with the chuck actuating cylinder; the sleeve having first engagement means to engage the first thrust member for movement of the first thrust member from the jaws retracted to the jaws extended positions, and a second engagement means to engage the retaining means to move the retaining means to permit the first thrust member to move from the jaws extending position to the jaws retracted position, the first and second engagement means being positioned so that when the drill is operating the first and second engagement means are disengaged from the first thrust member and the retaining means respectively to avoid interference therebetween.

13. A drill head as claimed in claim 12 in which:
i. the chuck actuating cylinder has a cylinder body and a piston rod extending therefrom, the cylinder body cooperating with the drill head mounting means, the piston rod cooperating with a flange of the actuating member, the drill head further including a disengaging means being a short stroke disengaging cylinder characterized by:
ii. a piston and a cylinder body carried on the piston rod of the chuck actuating cylinder, the cylinder body of the disengaging cylinder having a cylinder head and an intake port, the cylinder head and the piston defining in part a chamber communicating with the intake port, the cylinder head being adjacent the flange of the actuating member when the actuating member is in the jaws extended position, the disengaging cylinder being disposed so that extension thereof moves the cylinder head to contact the flange which causes the piston rod of the chuck actuating cylinder to move so as to disengage the chuck actuating means from the first thrust member, to permit rotation of the chuck without interference between the actuating member and the first thrust member.

14. A drill head as claimed in claim 13 further including:
i. a four-way, three-position control valve having two outputs connected to the chuck actuating cylinder to extend and retract the cylinder according to two outer positions, the valve having a central neutral position in which the outputs to the chuck actuating cylinder are interconnected to a sump and delivery pressure is blanked off so as to permit a piston of the chuck actuating cylinder to float,
ii. a pilot pressure actuated spring opened valve having on output connected to the intake port of the disengaging cylinder, the valve being responsive to pressure from the control valve when actuated to extend the chuck jaws, so that after the chuck actuating cylinder has been actuated to extend the jaws and actuating pressure has been reduced, the pilot pressure valve is opened and the disengaging cylinder is extended to move the piston rod of the actuating cylinder so as to disengage the chuck actuating means to permit free rotation of the drill.

15. A drill head as claimed in claim 12 in which:
i. the chuck actuating cylinder has a cylinder body and a piston rod extending therefrom, the cylinder body cooperating with the mounting means, the piston rod cooperating with a flange of the actuating member, and the drill head further includes a disengaging means characterized by:

ii. a resilient "0" ring encircling the piston rod of the chuck actuating cylinder, the rod having shoulder means spaced closely to the flange of the actuating member when the actuating member is in the jaws extended position, so that when the actuating member is initially actuated so as to contact and move the first thrust member, the "O" ring is compressed between the shoulder means and the flange, and after actuation, force on the actuating member is reduced sufficiently for the "O" ring to expand which moves the piston rod slightly to permit disengagement of the actuating member and the first thrust member, to permit rotation of the chuck without interference between the actuating member and the first thrust member.

16. A drill head as claimed in claim 5 including:
i. forward and aft bearings journalling the spindle in the mounting means,
ii. an annular oil reservoir provided between the bearings and surrounding the spindle,
iii. forward and aft pumps straddling the reservoir and communicating with the reservoir and both bearings so that irrespective of drill attitude at least one pump is immersed in oil and both bearings receive oil.

17. A drill head as claimed in claim 5 in which the drill chuck is characterized by:
i. each chuck jaw having a gripping face with an aligned recess therein,
ii. a generally circular, open-ended spring being fitted in the aligned recesses in the gripping faces of the chuck jaws, so that the spring engages the chuck jaws and acts in opposition to closing forces on the jaws, so as to force the jaws to the retracted position when the closing forces are removed.

18. A drill head as claimed in claim 5 in which the drill chuck is characterized by:
i. the collet sleeve having a female conical face which is inclined outwards forwardly,
ii. the spindle having a plurality of circumferentially spaced radially disposed openings,
iii. the plurality of chuck jaws are movable radially in the openings in response to axial movement of the collet sleeve, each jaw having an axial length defined as space between forward and aft end faces thereof which is shorter than axial length of the respective opening, the jaw tapering towards the aft end face, each chuck jaw having an axially disposed bore extending inwards from the aft end face thereof,
iv. a spring-loaded pin is carried in each bore of the respective jaw, the pin being slidable in the bore and extending aft from the aft end face of the jaw, so that, when the jaws are not gripping the drill rod, the spring-loaded pin of each jaw urges the respective jaw to a forward end of the opening to produce an axial clearance at the aft end of the jaw, and when the jaws are gripping the rod, an axial force on the rod resulting from drilling tends to move the jaws aft relative to the collet sleeve and in opposition to force from the pin so as to reduce the axial clearance and to increase inwards force on the chuck jaws augmenting gripping of the drill rod.

19. A drill head as claimed in claim 5 in which the drill chuck is characterized by:
i. the collet sleeve having a female conical face which is inclined outwards forwardly,
ii. the chuck jaws having outer faces complementary to conical face of the sleeve,
iii. the chuck having axially disposed, circumferentially spaced sludge clearance grooves provided between the conical face of the sleeve and the outer faces of the jaws to provide clearance for sludge and coolant to pass outwards from the drill head.

* * * * *